US007738645B2

(12) United States Patent
Kim

(10) Patent No.: US 7,738,645 B2
(45) Date of Patent: Jun. 15, 2010

(54) MOBILE TERMINAL AND MULTIMEDIA CONTENTS SERVICE PROVIDING SYSTEM AND METHOD FOR CALL CONNECTION WAITING USING THE SAME

(75) Inventor: Han-Su Kim, Suwon (KR)

(73) Assignee: LG Electronics Inc., Seoul (KR)

( * ) Notice: Subject to any disclaimer, the term of this patent is extended or adjusted under 35 U.S.C. 154(b) by 704 days.

(21) Appl. No.: 11/459,223

(22) Filed: Jul. 21, 2006

(65) Prior Publication Data

US 2007/0116221 A1    May 24, 2007

(30) Foreign Application Priority Data

Jul. 22, 2005    (KR)    ...... 10-2005-0067027

(51) Int. Cl.
*H04M 3/42* (2006.01)
(52) U.S. Cl. .............. 379/215.01; 379/207.1; 379/209.01; 379/157; 379/210.01; 379/207.09; 455/567; 455/415; 455/414.1; 455/566
(58) Field of Classification Search .......... 455/567, 455/412.1, 415, 414.1; 379/207.16, 215.01, 379/209.01, 210.01, 156–157; 709/203–206
See application file for complete search history.

(56) References Cited

U.S. PATENT DOCUMENTS

| 4,947,421 | A | * | 8/1990 | Toy et al. | 379/67.1 |
| 5,144,651 | A | * | 9/1992 | Cooper | 379/93.32 |
| 6,002,760 | A | * | 12/1999 | Gisby | 379/266.01 |
| 6,400,804 | B1 | * | 6/2002 | Bilder | 379/76 |
| 6,591,115 | B1 | * | 7/2003 | Chow et al. | 455/555 |
| 6,618,600 | B1 | * | 9/2003 | Chow et al. | 455/567 |
| 6,654,603 | B1 | * | 11/2003 | Chow et al. | 455/414.1 |
| 6,694,008 | B1 | * | 2/2004 | Mukherji et al. | 379/228 |
| 6,996,394 | B2 | * | 2/2006 | Minear et al. | 455/412.1 |
| 7,260,202 | B2 | * | 8/2007 | Laanti | 379/209.01 |
| 7,558,739 | B2 | * | 7/2009 | Thomson | 705/8 |
| 2002/0191775 | A1 | * | 12/2002 | Boies et al. | 379/266.01 |
| 2004/0174980 | A1 | * | 9/2004 | Knott et al. | 379/266.01 |
| 2005/0129187 | A1 | * | 6/2005 | Agapi et al. | 379/76 |
| 2005/0280545 | A1 |   | 12/2005 | Ryou |  |
| 2006/0109969 | A1 | * | 5/2006 | Oh | 379/207.16 |
| 2006/0225071 | A1 |   | 10/2006 | Kim |  |

* cited by examiner

*Primary Examiner*—Sharad Rampuria
(74) *Attorney, Agent, or Firm*—KED & Associates, LLP

(57) ABSTRACT

The present invention relates to a mobile terminal and a terminal communication system, and more particularly to, a mobile terminal, which allows multimedia contents service for waiting for call connection to be provided in a terminal communication system, and a multimedia contents service providing system and method for call connection waiting using the same. The mobile terminal comprises: a wireless communication unit which receives multimedia contents from a multimedia contents providing server during a call connection waiting time to process the same upon originating a call; an audio processing unit which outputs audio signals of the multimedia contents received through the wireless communication unit; a control unit which controls the multimedia contents set according to time intervals so as to be outputted during the call connection waiting time; and a display unit which displays the multimedia contents.

20 Claims, 4 Drawing Sheets

MOBILE TERMINAL AND MULTIMEDIA CONTENTS SERVICE PROVIDING SYSTEM AND METHOD FOR CALL CONNECTION WAITING USING THE SAME

BACKGROUND OF THE INVENTION

1. Field of the Invention

The present invention relates to a mobile terminal and a terminal communication system, and more particularly to, a mobile terminal, which allows multimedia contents service for waiting for call connection to be provided in a terminal communication system, and a multimedia contents service providing system and method for call connection waiting using the same.

2. Description of the Prior Art

In general, in a conventional terminal communication network, when a caller attempts to establish a telephone call connection through its terminal, the caller hears a ringing tone, that is, a ringback tone until the call connection between a calling terminal and a receiving terminal is completed.

Recently, instead of standardized ringback tones, specific sound sources are often provided.

Ringback tones currently in service are largely divided into two categories.

First, if a user sets a specific sound source as a ringback tone, the other party hears the specific sound source set by the user as a ringback tone while attempting a call to the user's terminal.

Second, if a user sets a specific sound source as a ringback tone, the user hears the specific sound source set by the user itself as a ringback tone while attempting a call to the other party through its terminal.

A ringback tone service currently in service in accordance with the prior art will be described in detail with reference to FIG. 1.

FIG. 1 is a block diagram showing a ringback tone service method to and system in accordance with the prior art.

Referring to FIG. 1, a caller originates a call to a base station 12 in order to make a phone call to a recipient's receiving terminal 14 through its calling terminal 11 (S11).

The base station 12 having received the call requests a ringback tone providing server 13 whether any ringback tone preset as authentication information of the receiving terminal 14 is present or not (S12).

Upon being requested about the presence of a ringback tone, if any ringback tone preset as authentication information of the receiving terminal 14 is present, the ringback tone providing server 13 transmits the preset ringback tone to the base station 12 (S13).

The base station 12 transmits the received ringback tone to the calling terminal 11 during a call connection waiting time. On the other hand, if no ringback tone preset as authentication information of the calling terminal 11 is present, a typical ringback tone is transmitted to the calling terminal 11 (S14).

Also, the base station 12 makes a call request to the recipient by forwarding the received call to the receiving terminal 14 (S15).

As the ringback tone service as described above is provided, instead of standardized and mechanical ringback tones, terminal subscribers can hear Korean pop music, pop songs, bird calls, rushing water, and further their own voice as a ringback tone, thereby giving them auditory satisfaction.

However, there is a problem in that while the spread of terminals having the external speaker and/or multimedia functions is increased, the prior art ringback tone service only offers auditory satisfaction.

SUMMARY OF THE INVENTION

Therefore, the present invention has been made in consideration of the above problem, and has as its object to provide a mobile terminal, which can provide multimedia contents including text, image files, audio files, moving picture files, etc., instead of a typical ringback tone or a sound source provided by a ringback tone service, and a multimedia contents service providing system and method for call connection waiting using the same.

To achieve the aforementioned object, there is provided a multimedia contents service providing system using a mobile terminal in accordance with the present invention, comprising: a receiving terminal which creates multimedia contents by segmenting a call connection waiting time into one or more time intervals and setting each multimedia data according to the segmented time intervals; a multimedia contents providing server which stores the multimedia contents and provides the multimedia contents to the receiving terminal; and a calling terminal which receives the provided multimedia contents and reproduces the same in real time.

Additionally, to achieve the aforementioned object, there is provided a multimedia contents service providing method using a mobile terminal in accordance with the present invention, comprising: segmenting a call connection waiting time between a receiving terminal and a calling terminal into one or more time intervals and setting each multimedia contents according to the segmented time intervals; and reproducing the set multimedia contents during the call connection waiting time.

Additionally, to achieve the aforementioned object, there is provided a mobile terminal in accordance with the present invention, comprising: a wireless communication unit which receives multimedia contents from a multimedia contents providing server during a call connection waiting time to process the same upon originating a call; an audio processing unit which outputs audio signals of the multimedia contents received through the wireless communication unit; a control unit which controls the multimedia contents set according to time intervals so as to be outputted during the call connection waiting time; and a display unit which displays the multimedia contents.

DETAILED DESCRIPTION OF THE INVENTION

Hereinafter, in an embodiment of the present invention, it is proposed to provide multimedia contents including text, image files, audio files, moving picture files, etc., instead of a typical ringback tone or a sound source provided by a ringback tone service, in a call connection waiting mode of a terminal.

In addition, it is designed so that a terminal user is given visual satisfaction as well as auditory satisfaction.

A mobile terminal and a multimedia contents service providing system and method for call connection waiting using the same in accordance with a preferred embodiment of the present invention will be described in detail with reference to the accompanying FIGS. 2 to 5.

Figure 1:
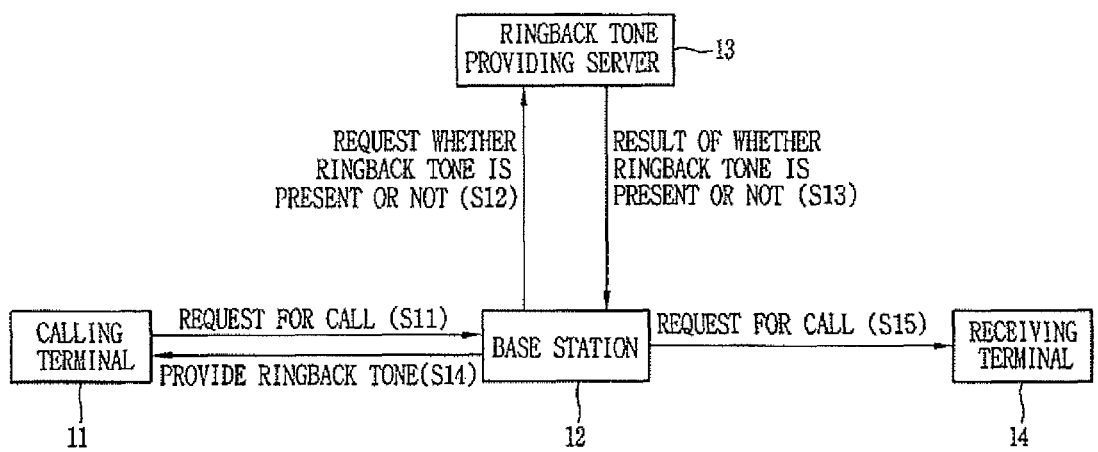
FIG. 1 is a block diagram showing a ringback tone service method and system in accordance with the prior art.
Figure 2:
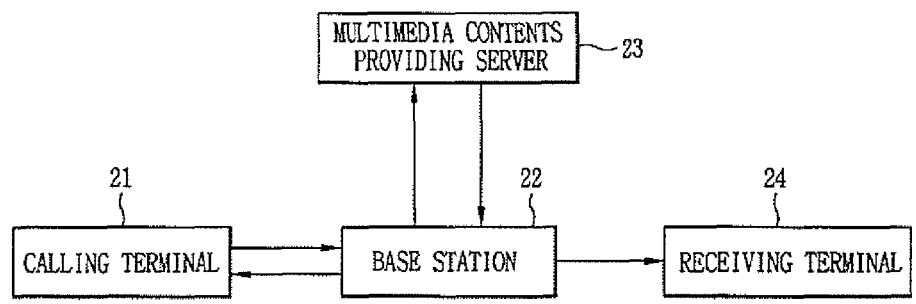
FIG. 2 is a block diagram showing the configuration of a multimedia contents service providing system for call connection waiting in accordance with the present invention.

FIG. 2 is a block diagram showing the configuration of a multimedia contents service providing system for call connection waiting in accordance with the present invention.

Referring to FIG. 2, the multimedia contents service providing system using a mobile terminal in accordance with the present invention comprises: a calling terminal 21 which creates multimedia contents by segmenting a call connection waiting time into one or more time intervals and setting each multimedia data according to the segmented time intervals; a multimedia contents providing server 23 which stores the multimedia contents and provides the multimedia contents to the calling terminal 21; a receiving terminal 24 which receives the provided multimedia contents and reproduces them in real time; and a base station 22 which relays data between the calling terminal 21, receiving terminal 24, and multimedia contents providing server 23.

The internal configuration of the calling and receiving terminals 21 and 24 will be explained below with reference to the accompanying drawings.

Figure 3:
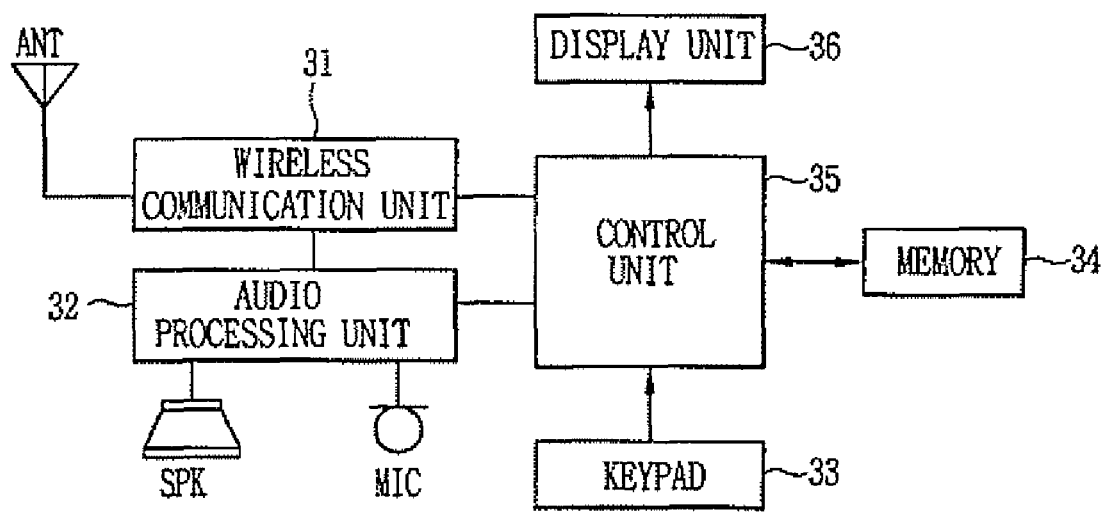
FIG. 3 is a block diagram showing the internal configuration of a mobile terminal in accordance with an embodiment of the present invention.

FIG. 3 is a block diagram showing the internal configuration of a mobile terminal in accordance with an embodiment of the present invention.

Referring to FIG. 3, a wireless communication unit 31 processes the sending and receiving of audio signals for call origination and termination and of sent and received messages. The wireless communication unit 31 originates a call to a base station, or receives a call from the base station. Also, the wireless communication unit 31 receives the multimedia contents, which are set according to time intervals provided by a multimedia contents server 23, from the base station 22 during a call connection waiting time in accordance with an embodiment of the present invention, and processes them. Here, the wireless communication unit 31 may include an RF transmitter for up-converting and amplifying a frequency of a signal to be transmitted, a RF receiver for low-noise amplifying a received signal and down-converting a frequency of the received signal, and a CODEC for coding and modulating the signal to be transmitted and demodulating and decoding the received signal. Here, the CODEC has a data CODEC for processing packet data and the like and an audio CODEC for processing an audio signal such as voice.

The audio processing unit 32 performs a function for reproducing a received audio signal output from the wireless communication unit 31 to output it to a speaker (SPK) or transmitting a transmission audio signal generated from a microphone (MIC) to the wireless communication unit 21. More specifically, the audio processing unit 32 outputs a voice signal of multimedia contents received through the wireless communication unit 31 to the speaker (SPK) in accordance with an embodiment of the present invention.

A keypad 33 includes keys necessary to input number and letter information and function keys necessary to set various functions. More specifically, the keypad 33 can include ringback tone setting keys and so on in accordance with an embodiment of the present invention.

A memory 34 can comprise program and data memories, and the like. The program memory can store programs for controlling the overall operation of the mobile terminal, and a program for setting multimedia contents for call connection waiting in accordance with an embodiment of the present invention. The data memory performs a function of temporally storing data generated while the above programs are executed.

A control unit 35 controls the overall operation of the mobile terminal. More specifically, the control unit 10 controls the overall operation for outputting multimedia contents received through the wireless communication unit 31 during a call connection waiting time through the audio processing unit 32 or the display unit 36 in accordance with an embodiment of the present invention. Also, the control unit 35 controls the overall operation for setting multimedia contents for call connection waiting according to time intervals in accordance with an embodiment of the present invention.

The display unit 36 displays messages generated while the programs are executed under the control of the control unit 35. The display unit 36 also displays multimedia contents in accordance with an embodiment of the present invention. The display unit 36 can include a LCD controller, a memory capable of storing image data, a LCD element, and so on. When the LCD is implemented using a touch-screen system, the keypad 33 and the LCD can serve as an input unit.

Hereinafter, operation of the multimedia contents service providing system for call connection waiting in accordance with the present invention will be described.

First, a multimedia contents service providing method in accordance with the present invention comprises the steps of: segmenting a call connection waiting time between a receiving terminal 24 and a calling terminal 21 into one or more time intervals and setting each multimedia contents according to the segmented time intervals; and reproducing the set multimedia contents during the call connection waiting time.

The multimedia contents service providing method in accordance with the present invention will be described below with reference to the accompanying drawings.

Figure 4:
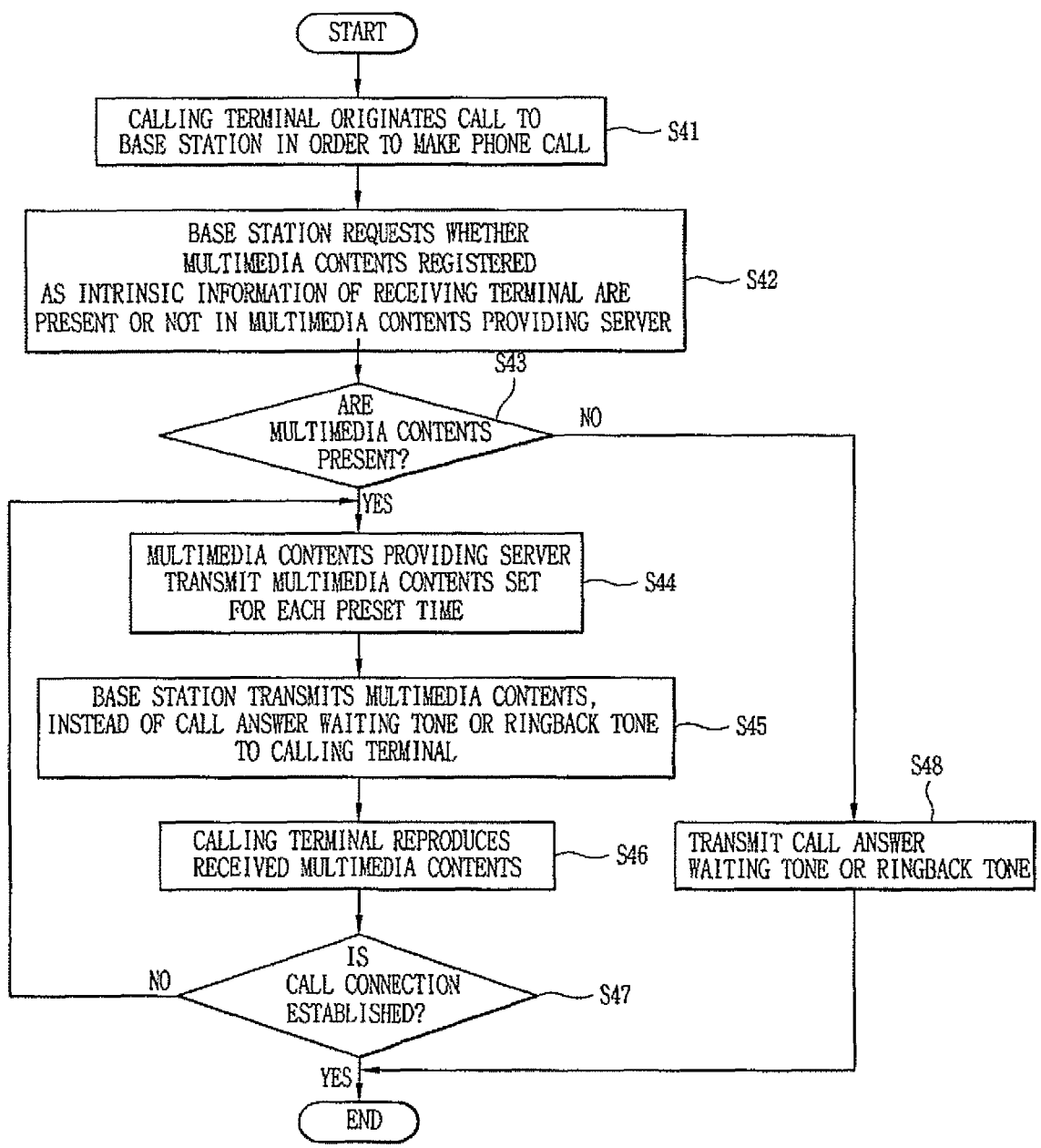
FIG. 4 is a flow chart showing a multimedia contents service providing system for call connection waiting in accordance with the present invention.

FIG. 4 is a flow chart showing a multimedia contents service providing system for call connection waiting in accordance with the present invention.

Referring to FIG. 4, the multimedia contents service providing system for call connection waiting in accordance with the present invention comprises: (S41) originating a call from a calling terminal 21 to a base station 22 in order to request a phone call with a receiving terminal 24; (S42) requesting a multimedia contents providing server 23 from the base station 22 whether any multimedia contents registered as authentication information of the receiving terminal 24 are present or not on the basis of the originated call; (S43) determining by the multimedia contents providing server 23 whether any multimedia contents registered as authentication information of the receiving terminal 24 are present; (S44) when any multimedia contents registered as authentication information of the receiving terminal 24 are present, transmitting the multimedia contents from the multimedia contents server 23 to the base station 22; (S45) transmitting the received multimedia contents from the base station 22 to the calling terminal 21; and (S46) reproducing the received multimedia contents by the calling terminal 21. At this time, when a call connection is made between the calling terminal 21 and the receiving terminal 24, the multimedia contents providing server 23 does not transmit the multimedia contents anymore.

Meanwhile, when no multimedia contents registered as authentication information of the receiving terminal 24 are present in the multimedia contents providing server 23, the base station 22 transmits a typical call waiting tone or ringback tone to the calling terminal 21 (S48).

The multimedia contents service providing method in accordance with the present invention will be described in detail.

First, the multimedia contents include text, image files, audio files, or moving picture files that are set according to one or more time intervals segmented from the call connection waiting time.

A calling terminal 21 originates a call to base station 22 in order to request a phone call with a receiving terminal 24 (S41).

The base station 22 requests a multimedia contents providing server 23 whether any multimedia contents registered as authentication information of the receiving terminal 24 are present or not on the basis of the originated call (S42).

In other words, on the basis of the phone number of the receiving terminal 24 to be entered into the calling terminal 21 by the caller, the base station 22 requests whether any multimedia contents registered for the phone number of the receiving terminal 24 are present or not in the multimedia contents providing server 23.

The requested multimedia contents providing server 23 checks whether any multimedia contents registered as authentication information of the receiving terminal 24 are present or not (S43). At this time, it is checked whether the registered multimedia contents are present or not on the basis of the phone number of the receiving terminal 24.

When any multimedia contents registered as authentication information of the receiving terminal 24 are present, the multimedia contents providing server 23 transmits the multimedia contents to the base station 22 (S44). Here, the multimedia contents to be transmitted may be transmitted differently depending on the calling terminal 21.

For example, in a case where the phone number of the calling terminal 21 belongs to Group A designated for the receiving terminal 24, the multimedia contents providing server 23 transmits first multimedia contents composed of a name card, a photo, and a self-instruction moving picture file to the base station 22. However, in a case where the phone number of the calling terminal 21 belongs to Group B designated for the receiving terminal 24, the multimedia contents providing server 23 transmits second multimedia contents composed of a photo and notification message with background music to the base station 22.

Further, the multimedia contents providing server 23 can automatically change the order of the contents of the multimedia contents and transmit them. That is, the multimedia contents providing server 23 can store the times during which the user of the receiving terminal 24 answer the phone to thus connect the call, and can change the order of the contents of the multimedia contents set to a different time length on the basis of statistical values of the stored times and transmit them. For example, typically, if the user of the receiving terminal 24 answers the phone after 25 seconds, the multimedia contents providing server 23 can firstly transmit the contents (e.g., a moving picture file) of the multimedia contents set at time intervals of about 25 seconds.

The base station 22 transmits the received multimedia contents to the calling terminal 21 (S45).

The calling terminal 21 reproduces the received multimedia contents through its speaker and/or screen (S46).

Thus, the caller views the multimedia contents to be reproduced in the calling terminal 21, keeping the calling terminal 21 a certain distance from the caller's body regions (especially, the head).

While viewing the multimedia contents, it is checked whether the call connection between the calling terminal 21 and the receiving terminal 24 is established or not.

Once the call connection between the calling terminal 21 and the receiving terminal 24 is established, the multimedia contents providing server 23 does not transmit the multimedia contents anymore.

However, if the call connection between the calling terminal 21 and the receiving terminal 24 is not established, the routines returns to the step S44, and repeatedly performs the steps S44 to S47 until the call connection is established.

Meanwhile, when any multimedia contents registered as authentication information of the receiving terminal 24 are not present in the multimedia contents providing server 23, the base station 22 transmits a typical call answer waiting tone or ringback tone to the calling terminal 21 (S48).

Here, the procedure of setting the multimedia contents is described as follows.

Time intervals of the multimedia contents and the contents of the multimedia contents set according to the time intervals are changed by the terminal user.

The time intervals of the multimedia contents can be set directly through the screen of the terminal by the user of the terminal, and also can be set through the internet homepage for supporting the setting of multimedia contents.

Therefore, the user of the terminal is able to change the contents of the multimedia contents and the time intervals thereof frequently while on the move, as well as at fixed locations, and hence increase the utility of the terminal.

Moreover, the contents of the multimedia contents can be set as an image file, moving picture file, text file, audio file, etc. directly through the screen of the terminal. Also, they can be set through the internet homepage for supporting the setting of multimedia contents as an image file, moving picture file, text file, audio file, etc. supported from the internet homepage.

The procedure of setting multimedia contents in accordance with the present invention will be described by way of example with reference to FIG. 4.

Figure 5:
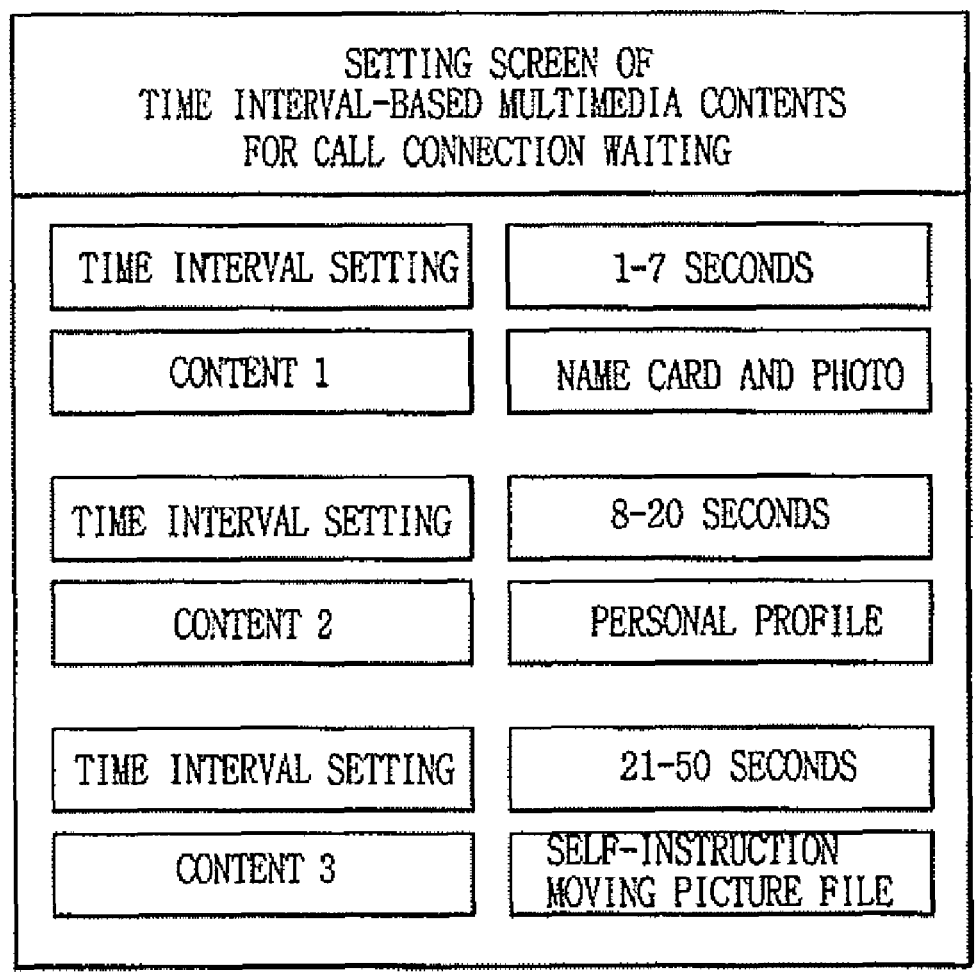
FIG. 5 is an illustrative view for explaining a multimedia contents setting procedure in accordance with the present invention.

FIG. 5 is an illustrative view for explaining a multimedia contents setting procedure in accordance with the present invention.

Referring to FIG. 5, if a total call connection waiting time is assumed to be 50 seconds, the terminal user sets a first time interval for Contents 1 as 1 to 7 seconds, a second time interval for Content 2 as 8 to seconds, and a third time interval for Content 3 as 21 to 50 seconds by dividing the call connection waiting time into three intervals. Then, the terminal user sets Content 1 as a name card and photo file, which is an image file, Content 2 as a personal profile file, which is a text file, and Content 3 as a self-instruction file, which is a moving picture file. In addition to this, the terminal user can additionally set as background music a classical audio file or personalized audio file. The time intervals are not limited to three time intervals, but can be set to one or more intervals and the contents according thereto can be set for each of the one or more intervals.

The multimedia contents thus set are pre-registered and stored in the multimedia contents providing server 23 by the user of the receiving terminal.

As described above in detail, the present invention provides multimedia contents composed of text, image files, audio files, moving picture files, etc., instead of a typical ringback tone or a sound source provided by a ringback tone service, in a call connection waiting mode of a terminal, so that the terminal user is given visual satisfaction as well as auditory satisfaction.

Furthermore, the present invention provides multimedia contents composed of text, image files, audio files, moving picture files, etc, in a call connection waiting mode of a terminal, so that people having a strong desire to express their individuality and character can present themselves in a more unique way. Besides, the present invention can deliver a notification message to people set as a specific group, and can be used as a means of advertisement.

What is claimed is:

1. A multimedia content service providing method for call connection waiting in a mobile terminal, in which a call connection is attempted to a receiving terminal, the method comprising:

receiving a command from a user for segmenting a call connection waiting time with the receiving terminal into one or more time intervals and for setting multimedia contents according to each of the segmented time intervals, segmenting the call connection waiting time between the receiving terminal and the calling terminal into one or more time intervals and setting each multimedia data according to the segmented time intervals;

setting the multimedia contents according to the user's command and transmitting the set information to a multimedia contents providing server, wherein the multimedia contents providing server stores the multimedia contents according to the set information and provides the multimedia contents to a calling terminal; and stopping the multimedia contents provided to the calling terminal by the multimedia contents providing server at a time of the call connection.

2. The method of claim 1, wherein the receiving terminal provides preset multimedia contents depending on the calling terminal.

3. The method of claim 1, wherein the multimedia contents include text, image files, audio files, or moving picture files that are set according to one or more time intervals segmented from the call connection waiting time.

4. The method of claim 3, wherein the one or more time intervals are changed through the receiving terminal or an internet homepage.

5. The method of claim 1, wherein the contents of the multimedia contents are changed through the receiving terminal or an internet homepage.

6. The method of claim 1, wherein the contents of the multimedia contents include text, image files, audio files, or moving picture files that are stored in the receiving terminal.

7. The method of claim 1, wherein the contents of the multimedia contents include text, image files, audio files, or moving picture files that are provided through an internet homepage.

8. The method of claim 1, wherein an order of the contents of the multimedia contents is automatically changed.

9. The method of claim 1, wherein an order of the contents of the multimedia contents is automatically changed based on statistical values of waiting times for the call connection.

10. A multimedia contents service providing system using a mobile terminal comprising:

a receiving terminal that creates multimedia contents by receiving a command from a user for segmenting a call connection waiting time into one or more time intervals and setting each multimedia data according to the segmented time intervals, wherein the call connection waiting time between the receiving terminal and the calling terminal is segmented into one or more time intervals and each multimedia data is set according to the segmented time intervals;

a multimedia contents providing server that stores the multimedia contents according to the set information and provides the multimedia contents to a calling terminal, wherein the multimedia contents providing server stops the multimedia contents provided to the calling terminal at a time of the call connection; and the calling terminal that receives the provided multimedia contents and reproduces the same.

11. The system of claim 10, wherein the multimedia contents providing server provides the multimedia contents depending on the calling terminal.

12. The system of claim 10, wherein the multimedia contents include text, image files, audio files, or moving picture files that are set according to the one or more time intervals.

13. The system of claim 12, wherein the one or more time intervals are changed through the receiving terminal or an internet homepage.

14. The system of claim 10, wherein the contents of the multimedia contents are changed through the receiving terminal or an internet homepage.

15. The system of claim 10, wherein the contents of the multimedia contents include text, image files, audio files, or moving picture files that are stored in the receiving terminal.

16. The system of claim 10, wherein the contents of the multimedia contents include text, image files, audio files, or moving picture files that are provided through an internet homepage.

17. The system of claim 10, wherein the multimedia contents providing server comprises a storage unit for storing the times for call connection.

18. The system of claim 17, wherein the multimedia contents providing server automatically changes an order of providing the multimedia contents based on the times for call connection stored in the storage unit.

19. The system of claim 10, wherein the multimedia contents server does not provide the multimedia contents to the receiving terminal anymore when a call connection is established.

20. A mobile terminal, comprising:

a wireless communication unit that receives multimedia contents from a multimedia contents providing server during a call connection waiting time to process the same upon originating a call, wherein the multimedia contents providing server stops the multimedia contents provided to the calling terminal at a time of the call connection;

an audio processing unit that outputs audio signals of the multimedia contents received through the wireless communication unit;

a control unit that controls the multimedia contents set according to time intervals so as to be outputted during the call connection waiting time, wherein the control unit segments the call connection waiting time into one or more time intervals and controls the multimedia contents to be set according to the segmented time intervals, and the call connection waiting time between the receiving terminal and the calling terminal is segmented into one or more time intervals and each multimedia data is set according to the segmented time intervals; and a display unit that displays the multimedia contents.

* * * * *